US011113029B2

(12) United States Patent
Ying et al.

(10) Patent No.: US 11,113,029 B2
(45) Date of Patent: Sep. 7, 2021

(54) PROBABILISTIC MATCHING OF WEB APPLICATION PROGRAM INTERFACE CODE USAGE TO SPECIFICATIONS

(71) Applicant: INTERNATIONAL BUSINESS MACHINES CORPORATION, Armonk, NY (US)

(72) Inventors: Annie T. Ying, Vancouver (CA); Christopher Charles Young, Kitchener (CA); John Erik Wittern, New York, NY (US); Yunhui Zheng, Elmsford, NY (US); Jim Laredo, Katonah, NY (US); Aleksander Slominski, Riverdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/380,964

(22) Filed: Apr. 10, 2019

(65) Prior Publication Data
US 2020/0326913 A1    Oct. 15, 2020

(51) Int. Cl.
*G06F 9/44* (2018.01)
*G06F 8/10* (2018.01)
*G06F 9/54* (2006.01)
*G06K 9/62* (2006.01)
*G06F 17/18* (2006.01)
*G06N 20/00* (2019.01)

(52) U.S. Cl.
CPC ............... *G06F 8/10* (2013.01); *G06F 9/54* (2013.01); *G06F 17/18* (2013.01); *G06K 9/6267* (2013.01); *G06N 20/00* (2019.01)

(58) Field of Classification Search
CPC .. G06F 8/10; G06F 9/54; G06F 17/18; G06N 20/00; G06K 9/6267
USPC ........................................................ 717/120
See application file for complete search history.

(56) References Cited

U.S. PATENT DOCUMENTS

| 10,083,298 | B1 | 9/2018 | Krishnappa |
| 10,089,119 | B2 | 10/2018 | Kishan et al. |
| 10,747,651 | B1 * | 8/2020 | Vanderwall ......... G06F 11/3692 |
| 2018/0309819 | A1 | 10/2018 | Thompson |

OTHER PUBLICATIONS

Acharya, M. et al., "Mining API Patterns as Partial Orders from Source Code: From Usage Scenarios to Specifications"; ACM (2007); 10 pgs.
Vasudev, R., "What is One Hot Encoding? Why and When do you have to use it?"; https:///hackernoon.com (2017); 4 pgs.
Wittern, E. et al., "Statically Checking Web API Requests in JavaScript"; arXiv:1702.03906v2 [cs.SE] Feb. 15, 2017; 11 pgs.

* cited by examiner

*Primary Examiner* — Chuck O Kendall
(74) *Attorney, Agent, or Firm* — Intelletek Law Group, PLLC; Gabriel Daniel, Esq.

(57) ABSTRACT

A method and system of matching an application program interface (API) code usage with an API specification are provided. A program having an API code usage is received and its features are extracted therefrom. Features from meta data of a plurality of API specifications are extracted. For each API specification of the plurality of API specifications, a match probability with the API code usage is determined. An API specification having a highest probability is determined. The API code usage is matched with the API specification having the highest probability.

20 Claims, 7 Drawing Sheets

PROBABILISTIC MATCHING OF WEB APPLICATION PROGRAM INTERFACE CODE USAGE TO SPECIFICATIONS

BACKGROUND

Technical Field

The present disclosure generally relates to Web Application Programming Interfaces (APIs), and more particularly, to matching Web API requests with a correct Web API.

Description of the Related Art

Today, programmers write applications using a growing variety of publicly accessible Web services. Applications can access and/or request these publicly accessible Web services by invoking their corresponding Web Application Programming Interfaces (web APIs). Such Web APIs have grown consistently over the years, as businesses realize the growth opportunities associated with running an open platform that developers can interact with. Common forms of interacting with these Web APIs include embedding external resources, such as tweets, Facebook comments, YouTube videos, Instagram photos, etc. Testing a Web API increases confidence in that the API performs as intended.

SUMMARY

According to various embodiments, a computing device, a non-transitory computer readable storage medium, and a method are provided to match an application program interface (API) code usage with an API specification. A program having an API code usage is received and its features extracted therefrom. Features from meta data of a plurality of API specifications are extracted. For each API specification of the plurality of API specifications, a match probability with the API code usage is determined. An API specification having a highest probability is determined. The API code usage is matched with the API specification having a highest probability.

In one embodiment, the features of the API code usage comprise at least one of a schema, an HTTP method, a host, one or more path segments, or one or more query parameters.

In one embodiment, extracting features from meta data of the plurality of API specifications includes, for each API specification: determining a specification release date; determining a date that a code snippet related to the API specification was last modified; determining the API versioning requirements imposed by library dependencies of the API code usage, and determining a version of the API specification.

In one embodiment, upon determining that the specification release date is after a date of the API code usage, the API specification is excluded from the matching.

In one embodiment, determining a match probability includes at least one of: using a text matching between the API specification and the API code usage; using a classification heuristic via machine learning; or using a clustering heuristic. The training data, for the creation of a model by the machine learning, may be self-generated by randomly removing features from API code usage, each having a known corresponding API specification.

In one embodiment, upon determining that the API specification having a highest probability is below a predetermine threshold, the match is identified as a failure and a notification is generated indicating that a probabilistic match could not be performed.

In one embodiment, upon matching the API code usage with the API specification having the highest probability, the program is allowed to communicate with a requested endpoint by way of the matched API specification.

According to one embodiment, a computer implemented method is provided. A program having an API code usage is received and its features extracted therefrom. Features from meta data of a plurality of API specifications are extracted. Upon determining that an exact match between the API code usage and the plurality of API specifications cannot be performed, for each API specification of the plurality of API specifications, a match probability with the API code usage is determined. An API specification having a highest probability is determined. The API code usage is matched with the API specification having a highest probability. Upon determining that the API specification having the highest probability is below a predetermine threshold, the match is identified as a failure and a notification is generated indicating that a probabilistic match could not be performed.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods of matching Web API code usage to corresponding API specifications by using a probabilistic approach. Today, applications increasingly use Web Application Programming Interfaces (hereinafter Web APIs) to programmatically interact with Web services. For example, Twitter and Facebook expose rich social networks through their APIs, Instagram enables programmatic access to millions of photos, or the IBM Watson APIs make diverse natural language capabilities accessible to applications. However, application developers using Web APIs face multiple challenges: APIs are to be discovered, selected, and understood to be correctly invoked, and these APIs are under the control of independent providers who can change the services in a way that may disrupt client programs. Furthermore, even for purported standardized notions such as the APIs' Uniform Resource Locator (URL) structures, Hypertext Transfer Protocol (HTTP) methods, or status codes, the semantics can differ across APIs. For the specifics on how APIs are to be used, application developers often use online documentations, many of which are semi-structured Hypertext Markup Language (HTML) based pages, referred to herein as API specifications.

Various formats of API specifications attempt to unify the description of URL templates, HTTP request types, headers, parameters, and data required to interact with Web APIs. For example, the OpenAPI specification is a machine understandable format, which enables, among other things, automatic synthesis of API and client code in various languages and generation of consistent, interactive API documentations for human developers. Other API specifications include, without limitation, Web Application Description Language (WADL), which is an XML-based format that describes services in a machine-processable way and/or the Web Service Description Language (WSDL), which is an XML format for describing Web services, such as by defining ports and messages, RESTful API Modeling Language (RAML), which provides the information to describe RESTful or practically RESTful APIs, Web Application Description Language (WADL), which is a machine-readable XML description of HTTP-based web services, and API blueprint, which is a high-level API description language for Web API's.

These Web API specifications describe how to interact with such APIs in a machine-understandable way. For example, they (i) define the endpoints to invoke, (ii) describe data sent to and received from a request, and (iii) define constraints on requests, such as headers, authentication, data formats, etc. Endpoints specify where resources lie that can be accessed by third party software. Usually the access is via a URI (Uniform Resource Identifier) to which HTTP requests are posed, and from which the response is thus expected. Put differently, the endpoints defined by the Web API specifications include the URL template and the HTTP method.

Programmers write applications using a growing variety of publicly accessible web services. Applications can access and/or request these publicly accessible web services, sometimes referred to herein as endpoints, by invoking their corresponding Web APIs over a network. API specifications can be found in various on-line documentations that expose the publicly accessible Web services. Such specifications (such as the OpenAPI specification, also known as Swagger) document valid uniform resource locators (URLs), hypertext transfer protocol (HTTP) methods, as well as inputs and outputs that a web API expects.

To access a web service by invoking a web API, the application sends HTTP requests to dedicated URLs using one of its supported HTTP methods. Relevant data is sent as query or path parameters, or within the HTTP request body. Resources are identified by URLs while the type of interaction (e.g., retrieval, update, deletion of a resource) depends on the HTTP method (such as "GET," "PUT"). The combination of a URL and HTTP method are referred to as an endpoint of a Web API. In order to be successfully invoked, some Web API endpoints depend on additional data, such as the ID of a resource being sent as a path parameter within the URL or a new/updated state of a resource being sent in the body of an HTTP request. The URL, the HTTP method, and data to send are all strings constructed by string operations (such as concatenation) within applications that invoke the Web API endpoint.

Matching API code usages to an API specification involves various challenges due to missing or ambiguous information in the API code usage. For example, one difficulty is that the URL/HTTP method/associated data can be obfuscated by string concatenations in the code. Another difficulty is that the base URL to an endpoint may not be in the code (i.e., initialized from external environment variables, configuration file, or a user interaction) due to proxying via infrastructure servers. Still another difficulty is related to the API ID (i.e., base URL) not uniquely identifying different API versions, or not being fully specified in an API index (e.g., due to proxying via infrastructure servers).

In one aspect, the teachings herein provide a probabilistic approach to accurately match an API code usage to API specifications. By virtue of the concepts herein, the technical problem of runtime errors related to API requests in applications are substantially reduced. Further, deprecation or transition scenarios, where an API code usage that is no longer supported or Web APIs that are no longer desired, can be identified. Similarly, API code usage that does not conform with threshold requirements can be identified. External service dependencies can be better understood and developers can better react to vulnerabilities and changes in API's. Reference now is made in detail to the examples illustrated in the accompanying drawings and discussed below.

Example Architecture

Figure 1:
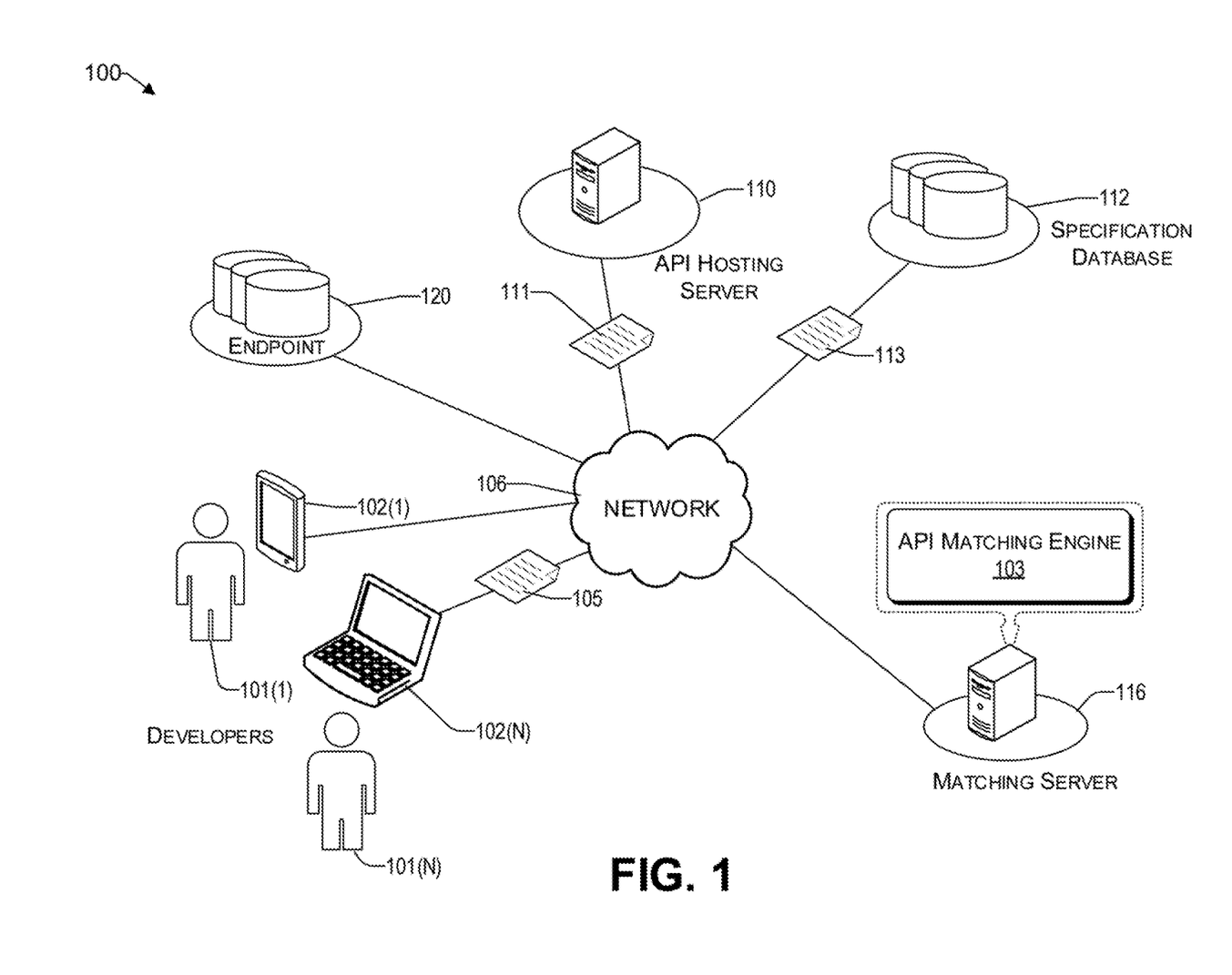
FIG. 1 illustrates an example architecture for implementing a probabilistic application program interface matching system.

FIG. 1 illustrates an example architecture 100 for implementing an API matching system. Architecture 100 includes a network 106 that allows various software developers 101(1) to 101(N) to communicate with various Web resources such as APIs (that may be stored in one or more hosting servers, such as server 110) and various endpoints (represented by endpoint 120), via a computing device 102, as well as any other components that are connected to the network 106, such as a specification database 112 and a matching server 116 having an API matching engine 103 running thereon.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows the API matching engine 103 on the matching server 116 to communicate with a specification database 112 to receive various API specifications 113 therefrom such that an API code usage in a program 105 is properly matched to an appropriate API specification, and by extension the correct API 111 to facilitate communication between the client (e.g., 102(N)) and an endpoint 120 via the matched API.

For purposes of later discussion, several user devices appear in the drawing, to represent some examples of the client devices that may receive various services via the network 106. Today, user devices typically take the form of portable handsets, smart-phones, tablet computers, personal digital assistants (PDAs), and smart watches, although they may be implemented in other form factors, including consumer, and business electronic devices.

A user device (e.g., 102(1)) may have various applications and APIs stored in its memory, which may be at various stages of development, and may supplement these applications with various APIs 110 and endpoints 120 found on the Web. Upon completion, a developer may promote their API for public use, represented by the API hosting server 110, which may be in the cloud.

In one embodiment, there is a specification database 112 that includes API specifications 113 of corresponding Web APIs. Each specification 113 is a machine-readable document that provides a complete explanation of the intended operation of the corresponding Web API, including its behavior and how it links to other Web APIs. It describes the components, such as endpoints (e.g., 120), data, parameters, and the like, of the corresponding Web API and the intended behavior of the components.

For example, an API specification 113 may describe how to invoke an endpoint and the type of data that should be sent to the API. Further, the API specification 113 also provides various features, such as the schema, HTTP method, host, query parameters, and path segments of the API, discussed in more detail later. These parameters and features may be used by the API matching engine 103 to later probabilistically identify which API specification most closely matches an API code usage in a program 105 provided from a user device (e.g., 102(N)) of a developer (e.g., 101(N)). In one embodiment, the probabilistic matching discussed herein is performed based on sources beyond that of the request (i.e., API code usage). For example, the matching involves metadata of the API specification, as well as other parts of the API code usage, discussed in more detail below.

While the API hosting server 110, the specification database 112, and the matching server 116 are illustrated by way of example to be on different platforms, it will be understood that in various embodiments, the API hosting server 110, specification database 112, and the matching server 116 may be combined in various combinations. In other embodiments, these computing platforms may be implemented by virtual computing devices in the form of virtual machines or software containers that are hosted in a cloud, thereby providing an elastic architecture for processing and storage.

Example Matching Between API Code Usage and Corresponding Specification

Figure 2:
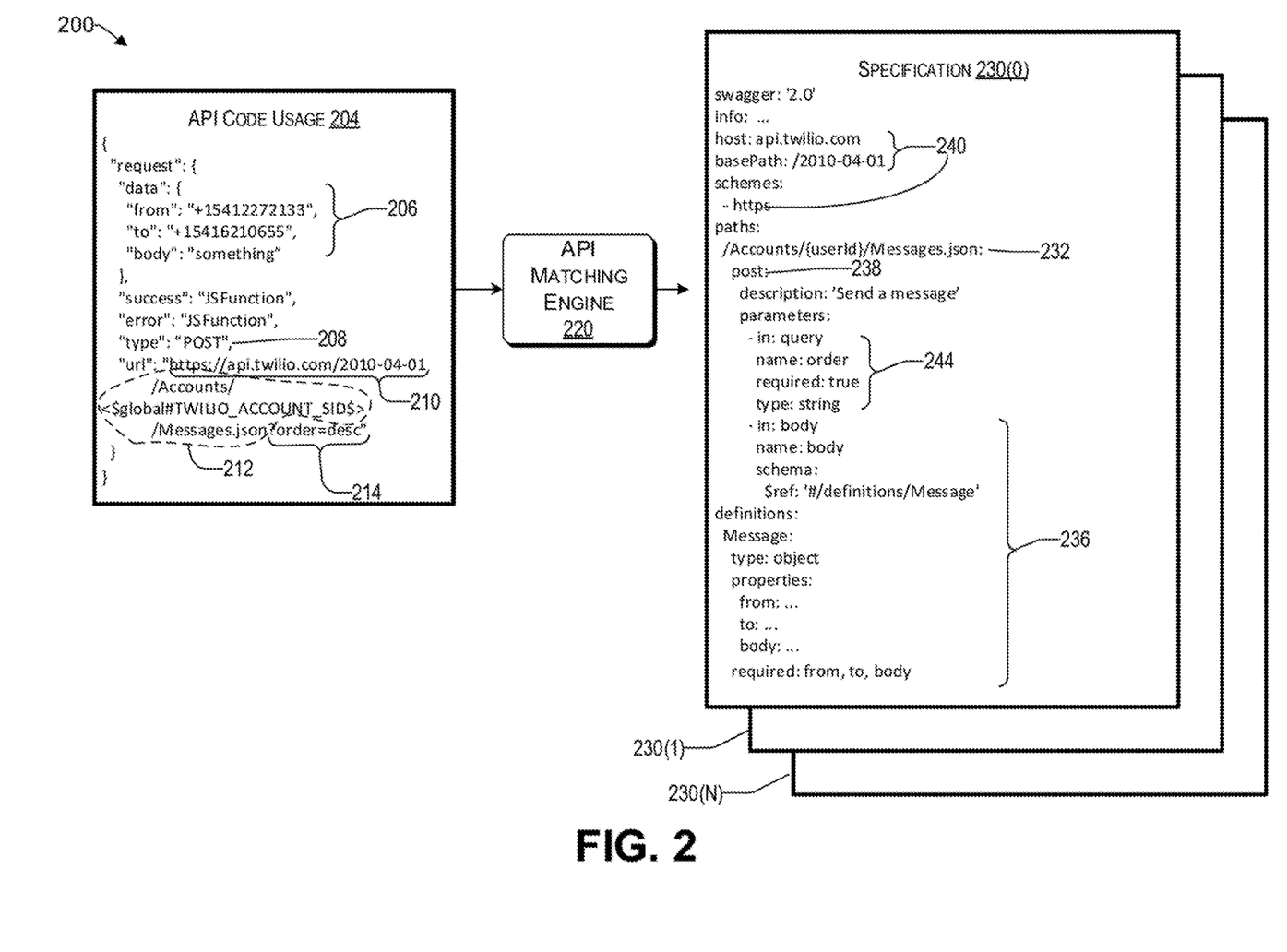
FIG. 2 illustrates a high-level conceptual block diagram of a system that can perform an exact match between an application program interface code usage and a corresponding specification, consistent with an illustrative embodiment.

FIG. 2 illustrates a high-level conceptual block diagram of a system 200 that can perform an exact (i.e., deterministic) match between an API code usage and a corresponding specification, consistent with an illustrative embodiment. For example, a program may have several instances of API code usage. Each API code usage 204 within the program is examined by the API matching engine 220 in order to find a match with a corresponding specification 230(0) to 230(N). To that end, the API matching engine 220 determines a base URL 210, path 212, method 208, query parameters 214, and the schema 206 of the API code usage 204. The API matching engine then determines which of the specification 230(0) to 230(N) provide matching features. In the example of FIG. 2, specification 230(0) includes a base URL 240, path 232, method 238, query parameters 244, and schema 236 that provide an exact match. However, an identical match is not always possible. Consequently, a probabilistic approach is pursued, as discussed in more detail below.

Example Processes

Figure 3:
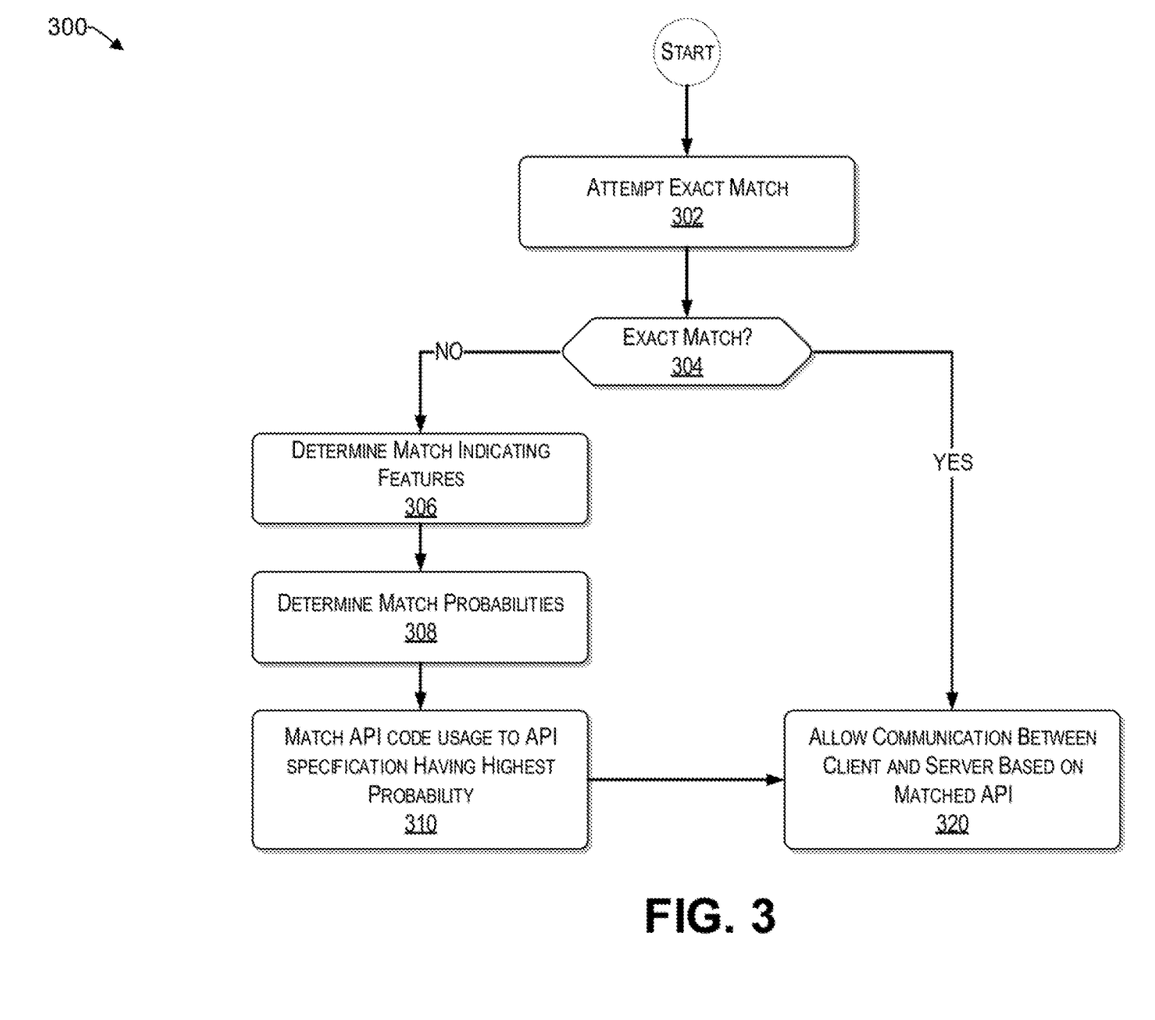
FIG. 3 provides an overview of an example high level flow performed by a matching engine having an exact matching component and a probabilistic component, consistent with an illustrative embodiment.
Figure 6:
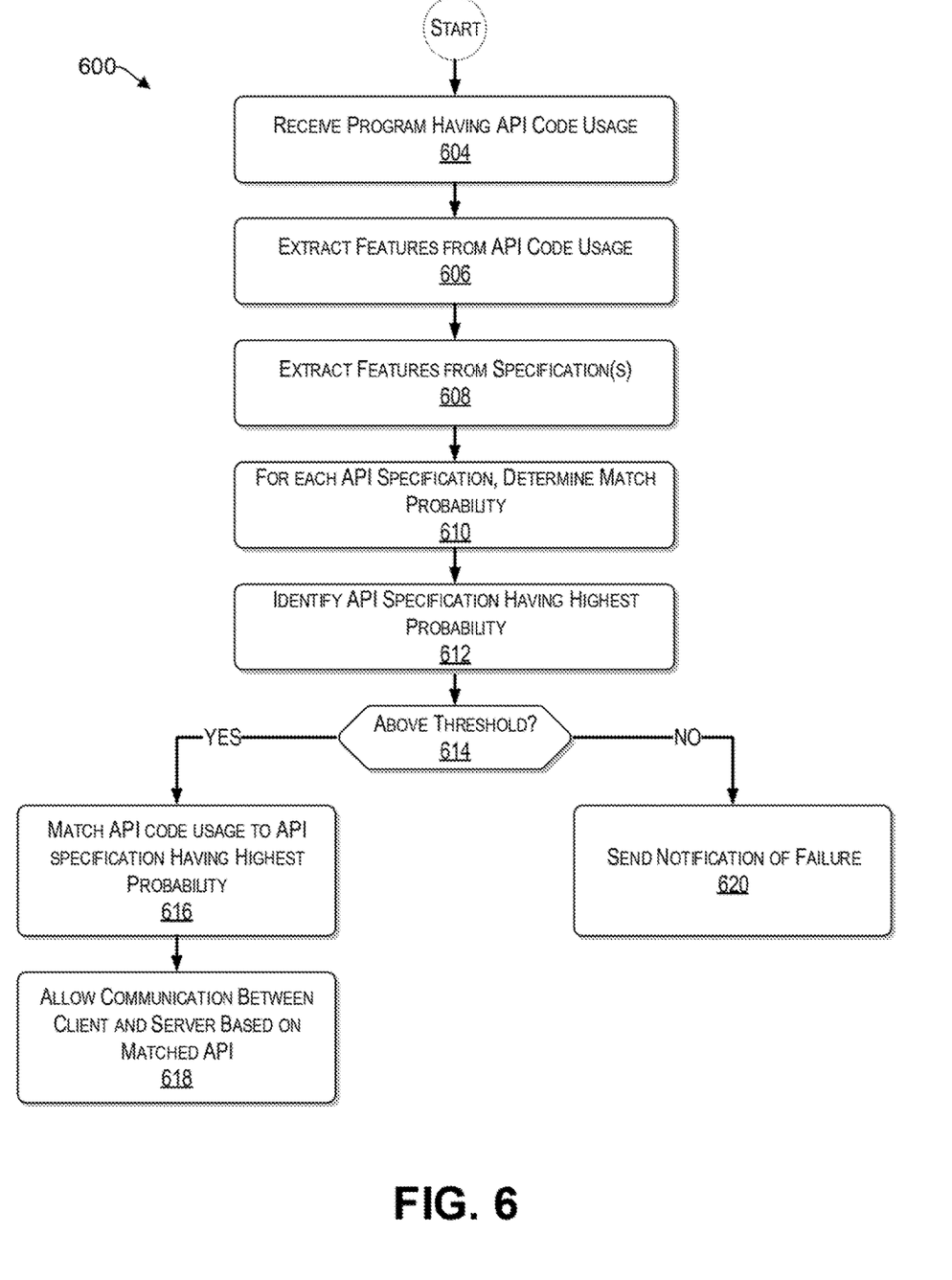
FIG. 6 is an illustrative process for probabilistically matching an API code usage with a corresponding API specification.

With the foregoing overview of the example architecture 100 of an API matching system, it may be helpful now to consider a high-level discussion of example processes. To that end, FIGS. 3 and 6 present illustrative processes 300 and 600 for matching an API code usage with a corresponding API specification. Processes 300 and 600 are each illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 300 and 600 are described with reference to the architecture 100 of FIG. 1.

More particularly, FIG. 3 provides an overview of an example high level flow performed by a matching engine having an exact matching component and a probabilistic component, consistent with an illustrative embodiment. In block 302, upon a trigger event, the API matching engine attempts to perform an exact match between an API Specification and an API invoked by a code. A trigger event may be a request by a third-party software developer who has developed a program that includes one or more APIs. In other embodiments, a trigger event may be generated every time a program that includes API code usage is updated. In one embodiment, the process 300 can be run automatically as part of a software development and information technology operations (DevOps) pipeline (e.g., whenever a program that includes API code usage is updated).

At block 304, the API matching engine 103 determines whether there is an exact match. If an exact match is identified (i.e., "YES" at decision block 304), then the probability of an exact match is ideal (100%) and a probabilistic analysis need not be performed. Instead, the process continues with block 320, which allows the client having the program that includes the subject API code usage, to communicate with a requested endpoint by way of the matched API.

However, if an exact match could not be performed by the API matching engine 103 (i.e., "NO" at decision block 304) the process continues with block 306, which invokes probabilistic matching module of the API matching engine. More particularly, at block 306, the match indicating features are identified. To that end, various features from the API code usage are identified. These features may include, without limitation, the schema (e.g., $f_1$—"https"), HTTP method (e.g., $f_2$—"get"), host (e.g., $f_3$—"api.twilio.com"), query parameters (e.g., $f_{j+1}, \ldots, f_m$ "order" 214 of FIG. 2), and path segments generated by splitting path using "/" (e.g., $f_4, \ldots, f_i$"). The following code provides examples:

Example 1

Consider the following URL extracted from the code snippet. https://api.twilio.com/2010-04-01/Accounts/<$TWILIO_ACCOUNT_SID$>/Messages.json, where "TWILIO_ACCOUNT_SID" is a variable. The identified features are the schema ("https"), the host (api.twilio.com), the path segments ("2010-04-01", "Accounts", TWILIO_ACCOUNT_SID, "Messages.json").

Example 2

If the extracted path is variable VARIABLE_PATH, it is identified as the path segment feature.

The determination of match indicating features of block 306 further includes extracting meta data from the specification, such as the specification release date, code snippet last modified date, the API versioning requirements imposed by library dependencies, and the API specification versions thereof.

In one embodiment, each of the variables undergo encoding to transform the categorical data of the features into continuous data, which is more compatible for machine learning. To that end, dummy variable encoding and/or one hot encoding approaches can be used. Dummy coding refers to the process of coding a categorical variable into dichotomous variables. Similarly, one hot encoding is a process by which categorical variables are converted into a form that could be provided to machine learning algorithms to facilitate prediction. One-hot encoding converts the data into n variables, while dummy encoding converts it into n−1 variables. If we have k categorical variable, each having n values, one hot encoding provides kn variables, while dummy encoding provides kn−k variables.

For example, in the context of one hot encoding, for each feature $f_j$, non-variable values are collected and treated as categorical values. We assume that there are k unique such values. We also assume that the variables can be any of the categorical values with equal probability. For non-variable values, we assign a "1" to the corresponding dummy feature. For variables, we assign "1/k" to each dummy feature.

By way of example, assume that "foo", "bar", VARIABLE_X and VARIABLY_Y are all observed values of feature fj. The dummy features in this example are $f_j$_foo and $f_j$_bar. If an instance's $f_j$ is "foo" the resulting encoding is: $f_j$_foo=1 and $f_j$_bar=0. If an instance's $f_j$ is VARIABLE_X, its resulting encoding is $f_j$_foo=½ and $f_j$_bar=½. Accordingly, by virtue of converting the data presented by the features of the code usage and the meta data of the API specifications from categorical to dichotomous variables, the converted data can be more efficiently processed by machine learning algorithms.

At block 308 the API matching engine determines the match probabilities between the API code usage and the API specification based on the extracted features of each. In various embodiments, different approaches can be used, including (i) text matching, (ii) classification, and (iii) clustering, each explained in more detail below.

At block 310, the API matching engine 103 matches the API code usage with the API specification having the highest probability. Accordingly, the client, where the program that includes the subject API code usage, can now communicate with requested endpoint by way of the matched API (i.e., block 320).

Figure 4:
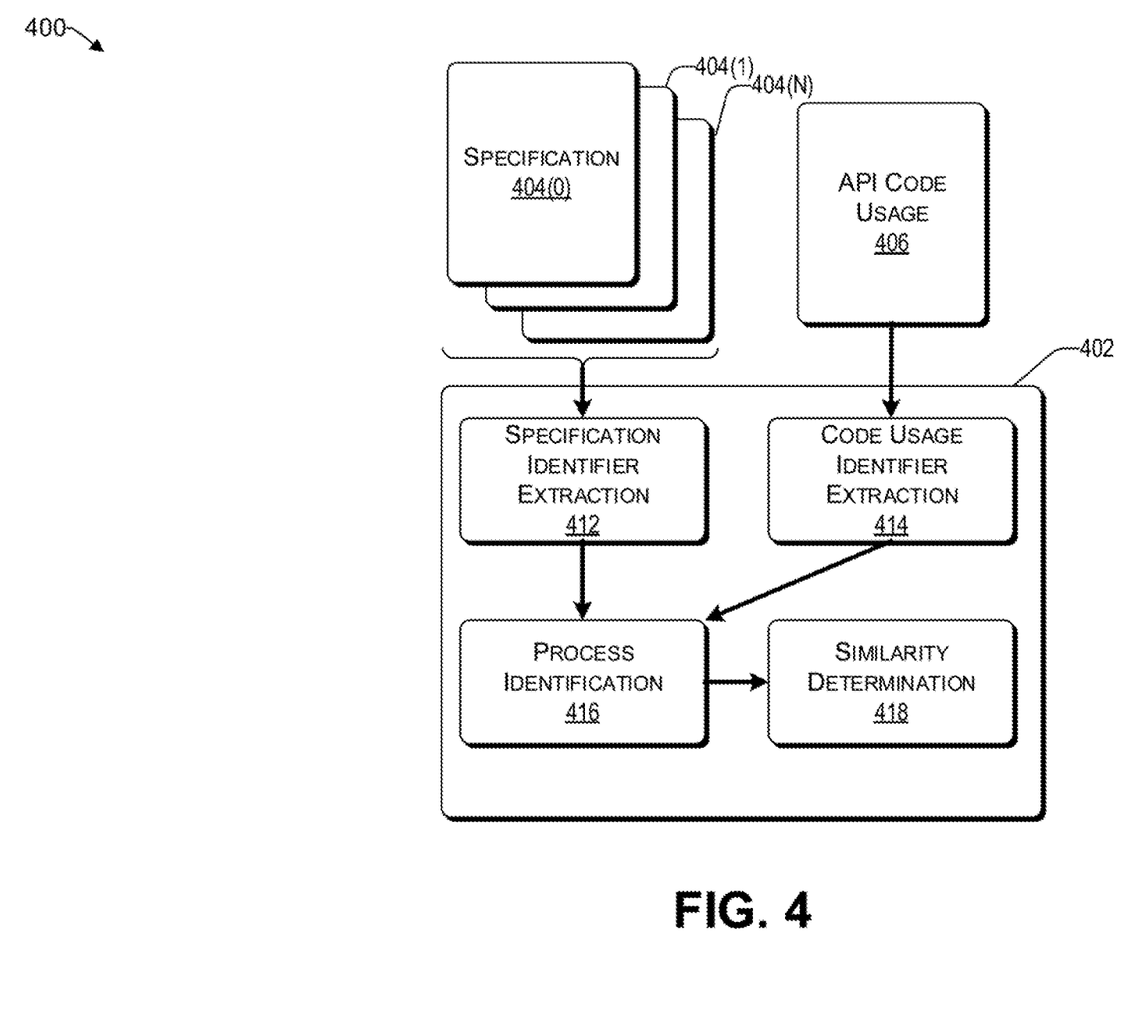
FIG. 4, which is a block diagram of modules associated with a text matching approach of the application program interface matching engine.

Reference now is made to FIG. 4, which is a block diagram 400 of modules associated with text matching of the API matching engine. In text matching, term frequency-inverse document frequency (TF-IDF) is used to determine a probability of an API code usage corresponding to an API specification. TF-IDF, is a numerical statistic that is operative to reflect how important a word is to a document in a corpus of information. To that end, for each API specification (e.g., OpenAPI 404(1) to 404(N)), relevant features of the corresponding specification are extracted by a specification identifier extraction module 412. The relevant features may include, without limitation, info.title, server.url, paths, operation IDs, parameter names, process JSON schema, etc., thereby creating a text matching. For example, in petstore.yaml1 below, the extracted indentifiers are: "Swagger Petstore", http://petstore.swagger.io/v1, pets, listPets, limit, etc.

Accordingly, the specification identifier extraction module of the API matching engine 402 creates a list of features for each API specification 404(0) to 404(N) it has access to. There is a code usage feature extraction module 414 operative to extract identifiers in the client code (i.e., API code usage 406) via static analysis. The identifiers in the client code may include, without limitation, configuration files, configuration values (e.g., endpoint URL).

The API matching engine 402 includes a process identification module 416 that is operative to parse the identifiers into words. For example, camel-casing (e.g., "PetStore" is parsed into "pet" and "store") may be undone, the URLs are broken into words (e.g., URL http://example/pet/store parsed into "example," "pet," and "store"), etc. Tokenization is performed to remove duplicates to create a bag of words (BOW) for the API specifications and the API code usage. In BOW, the number of times a word appears in a document, such as the API specification 404(0) or the API code usage 406, is determined. BOW lists words paired with their word counts per document. The frequency of each word is effectively converted to represent the probabilities of the words' occurrence in the document. Probabilities that surpass predetermined thresholds activate nodes in a neural network that influence the document's classification.

Accordingly, the API engine 402 can use natural learning processing (NLP) to process the raw content of the API code usage. In one embodiment, concept expansion, such as the IBM Watson concept expansion, can be used to identify the concept cues in the API code usage 406 and the API specification provided by the specification identifier extraction module 412.

The API matching engine 402 includes a similarity determination module 418 that is operative to determine similarities between the API specification and the API code usage. To that end, TF-IDF and cosine similarity may be used to find which API specification's BOW is most similar to the API code usage BOW. With TF-IDF, words are given weight—TF-IDF measures relevance, not frequency. That is, wordcounts are replaced with TF-IDF scores across the whole dataset. First, TF-IDF measures the number of times that words appear in a given document (i.e., "term frequency"). But because words such as "and" or "the" appear frequently in some documents, those can be systematically discounted. That's the inverse-document frequency part.

The more API specifications a word appears in, the less valuable that word is as a signal to differentiate any given document. That's intended to leave only the frequent AND distinctive words as markers. Each word's TF-IDF relevance is a normalized data format that adds up to one.

In one embodiment, the cosine similarity between the API specification's BOW and the API code usage BOW is used to determine which API specification provides a best probabilistic match to the API code usage. If the cosine similarity scores are within a threshold, it may be indicative that the API code usage could be compatible with more than one specification. Further, if the confidence in the match is below a predetermined threshold, then a match is deemed not to be performed by the API matching engine, and an error code may be sent to a user of the API code usage 406.

As mentioned above, in one embodiment, the determination of match probabilities is based on using a classifier via supervised machine learning. To that end, reference now is made to FIG. 5, which is a block diagram of modules associated with a classifier matching of the API matching engine. Machine learning is used herein to construct algorithms that can learn from and make predictions based on the data 502 provided to the API matching engine during an offline phase, sometimes referred to herein as a training phase (represented by training module 512). Such algorithms operate by building a model 514 from stored prior inputs or baselines therefrom in order to make data-driven predictions or decisions, rather than following strictly static criteria. Based on the machine learning, patterns in API code usage 502 are identified, thereby being able to match an API code usage provided during an "online" phase to a corresponding API specification.

Figure 5:
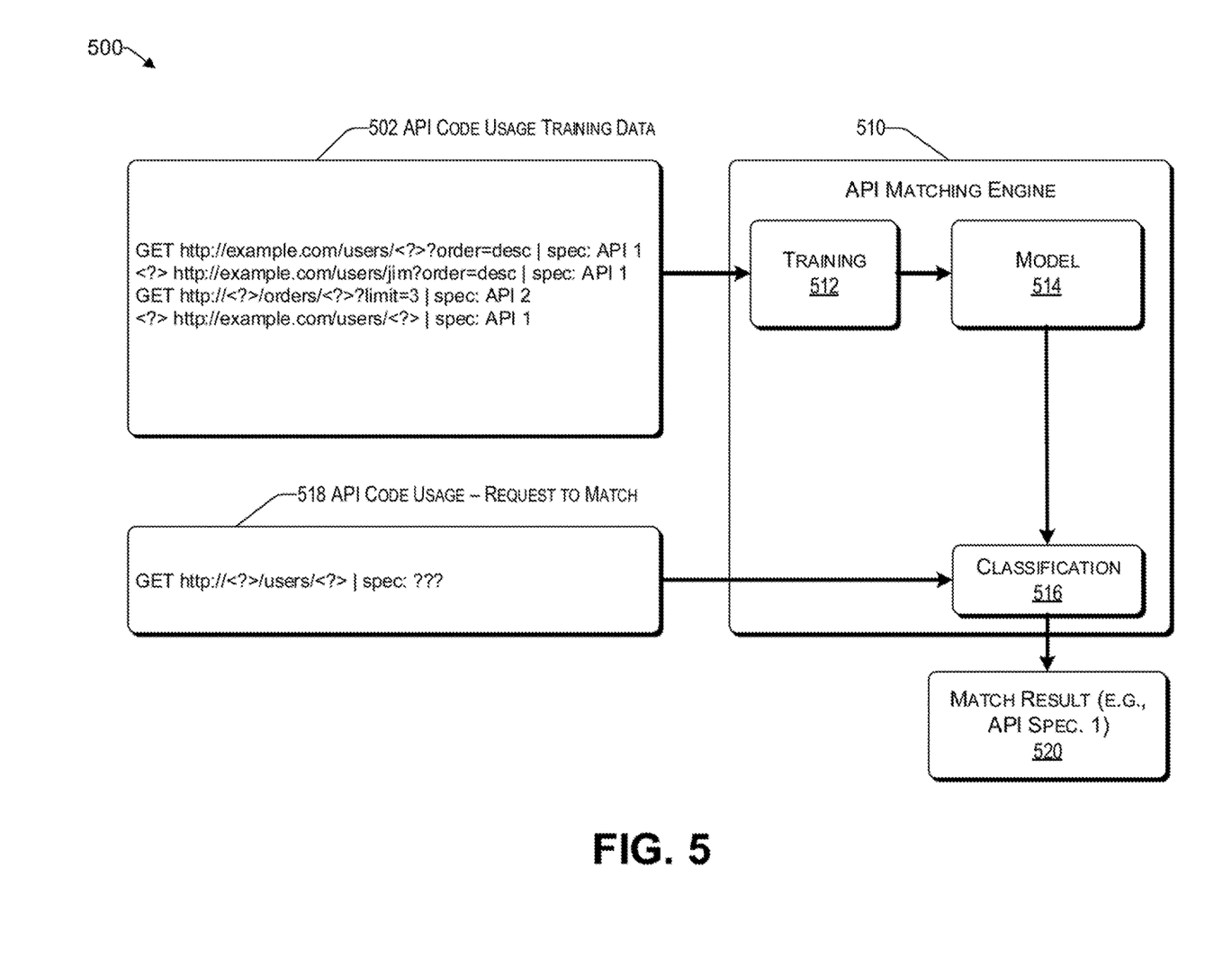
FIG. 5 is a block diagram of modules associated with a classifier matching of the application program interface matching engine.

For example, during the training phase, a training module 512 of the API matching engine 510 receives API code usage 502 wherein one or more parameters (identifiers) are removed therefrom, represented by "?" in the API code usage block 502. Such training is continued with different removed parameters until a model 514 can be generated that has a sufficient confidence level. Based on the corpus of information received from the API code usage. Significantly, this corpus of training data need not be harvested from various cases; rather, existing API code usage with an identified corresponding API specification can be used by randomly removing one or more parameters therefrom. By virtue of this self generation of training data, an arbitrarily large sample size can be made available for training, depending on the accuracy of the model 514 desired. What is not removed from the training data 502 is the correspondence between the API code usage and its API specification.

In various embodiments, the machine learning discussed herein in the context of using a classifier is by way of supervised learning. In supervised learning, the training module 512 of the API matching engine 510 is presented with example data of API code usage with one or more parameters missing, which is identified to correlate with a specific API specification. Put differently, the training data represented by the auto generated API code usage 502 is used as a teacher for the API matching engine 510.

Upon sufficient training, a model 514 is generated by the API matching engine 510, which can be used in the classification 516, of a new API code usage 518, during a second phase, sometimes referred to herein as an online phase, of operation. Thus, the classifier 516 can be presented with new data (i.e., features extracted from API code usage) in order to correlate it with an appropriate API specification. Such correlation may be performed on several API specifications. The correlation that has the best confidence level is deemed to correspond to a correct match 520. In one embodiment a confidence level that is below a predetermined threshold for correlation is deemed not to be successful (i.e., match failure). In this regard, a notification (i.e., error message) is generated and sent to an appropriate recipient (e.g., a user or developer of the API code usage) to indicate that an appropriate API specification could not be matched.

As mentioned above, in one embodiment, the determination of match probabilities is based on clustering of API code usage with an API specification. As used herein cluster analysis or clustering is the task of grouping a set of objects in such a way that objects in the same group are more similar to each other than to those in other groups. More particularly, the features of the API code usage and API specification are each converted to vectors using the one hot encoding method explained previously. The standard Mahalanobis distance can be used to measure the distance between the two observations of the API code usage and the API specification $\vec{x}$ and $\vec{y}$, respectively, which is provided by the expression below:

$$d(\vec{x}, \vec{y}) = \sqrt{(\vec{x}-\vec{y})^T S^{-1} (\vec{x}-\vec{y})} \qquad \text{(Eq. 1)}$$

The covariance matrix S used by the Mahalanobis distance is provided below:

$$\begin{bmatrix} w_1 & \cdots & 0 \\ \vdots & \ddots & \vdots \\ 0 & \cdots & w_n \end{bmatrix}, \qquad \text{(Eq. 2)}$$

As host and path features are more important than other features, the API matching engine uses larger weights for the corresponding dummy features in the covariance matrix.

In one embodiment, modified k-means clustering is used to consider features of the API specification when assigning labels. K-means clustering partitions the n observations in the API code usage and the API specification, respectively, each into k clusters in which each observation belongs to the cluster with the nearest mean, serving as a prototype of the cluster. Temporal constraints are applied to the API usage last modified date and the specification release date in order to rule out API specification and API code usage match. For example, if the API code usage was created earlier than the API specification release date, then the API code usage and the API specification cannot be in the same cluster.

In one embodiment, the API versioning requirements imposed by the library dependencies of the API code usage can further filter out the matches between the API code usage and the API specification versions. For example, suppose the API code usage depends on a library that only works with API specification version y or earlier releases. The matches with API specification releases after version y can be ruled out. In this regard, given a set of API code usages $x^1, \ldots, x^m$, and a set of API specifications $s^1, \ldots, s^n$, a label $c^i$ is produced for each API code usage $x^i$. In a first step, n cluster centroids $\mu^1 = s^1, \ldots, \mu^n = s^n$ are initialized. In a second step, the following process is repeated until convergence is reached:

For every i, set $$c^i := \underset{j}{\operatorname{argmin}}\, d(x^i, \mu^j) \text{ and date } (x^i) >= \text{date } (s^j); \qquad \text{(Eq. 3)}$$

where $d(x^i, \mu^i)$ is the Mahalanobis distance;

For each j, set $$\mu^j := \frac{\sum_{i=1}^{m} 1\{c^i = j\} x^i}{\sum_{i=1}^{m} 1\{c^i = j\}}$$ (Eq. 4)

Returning to FIG. 3, as discussed above, in various embodiments, (i) text matching, (ii) classification, and (iii) clustering can be used to determine a match between API code usage and an API specification (i.e., block 308). Upon determining a match, the process continues with block 320, which allows the client, where the program that includes the subject API code usage, to communicate with the endpoint by way of the matched API.

Reference now is made to FIG. 6, which is an illustrative process 600 for probabilistically matching an API code usage with a corresponding API specification. At block 604, the API matching engine 103 receives a program having API code usage. For example, the program may be from a software developer 101(N) who wants to make sure that a program being developed can successfully communicate with one or more endpoints 120 by way of an API.

At block 606, the API matching engine 103 extracts features from the API code usage of the received program. The features of the API code usage comprise at least one of: a schema, an HTTP method, a host, one or more path segments, or one or more query parameters.

At block 608, the API matching engine 103 extracts features from API specifications it has access to (e.g., from an API specification database 112). To that end, for each API specification, a specification release date, a date code of a snippet of the API modified, the API versioning requirements imposed by the library dependencies of the API code usages, and API specification may be extracted.

At block 610, for each API specification of the plurality of API specifications, the API matching engine 103 determines a match probability with the API code usage. In various embodiments, different approaches, such as text matching, classification, and clustering, as discussed herein, are used. In one embodiment, different approaches are used until an API specification having a highest probability is above a predetermined threshold. For example, text matching is performed first. If such approach provides a match that is above a predetermined threshold, then classification and clustering are not performed, thereby saving valuable computing resources. However, if text matching does not provide a match that is above a predetermined threshold, then classification is pursued, and so on, until a match having a confidence level that is above a predetermined threshold is found, or a match is deemed not to be found. Some of these concepts are discussed in more detail in the context of block 612 below.

At block 612, the API matching engine 103 determines which API specification from the plurality of API specifications has the highest match probability with the API code usage. In one embodiment, at block 614, a determination is made whether the API specification having the highest probability is above a predetermined threshold. If not ("NO" at decision block 614), the process continues with block 620, where the match is deemed a failure and a notification is send to an appropriate recipient, such as a developer of the program of the subject API code usage. If the probability is above a predetermined threshold ("YES" at decision block 614), the process continues with block 616.

At block 616, the API matching engine 103 matches the API code usage with the API specification having the highest probability. Accordingly, the client, where the program that includes the subject API code usage, can now communicate with requested endpoint by way of the matched API (i.e., block 618).

Example Computer Platform

Figure 7:
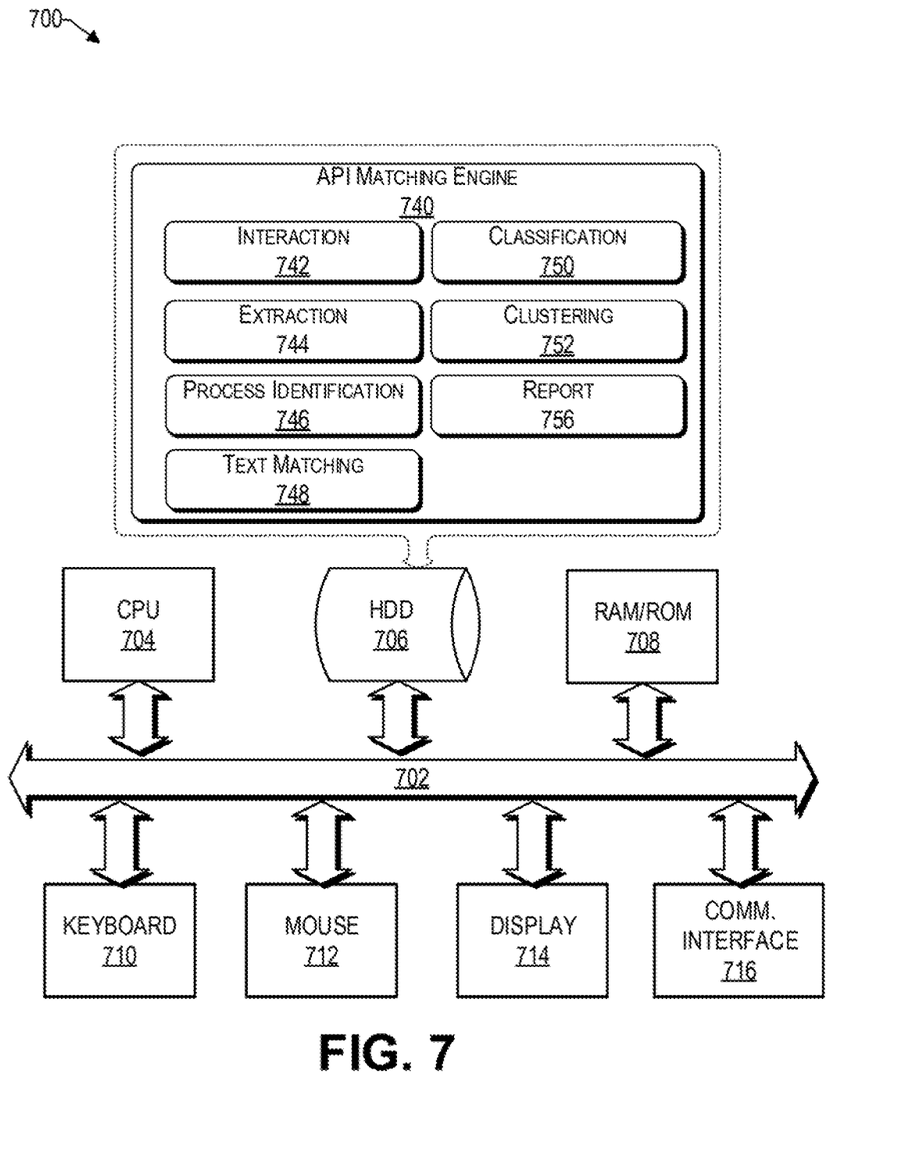
FIG. 7 is a functional block diagram illustration of an appropriately configured computer hardware platform that can communicate with various networked components, consistent with an illustrative embodiment.

As discussed above, functions relating to probabilistically matching an API code usage to an API specification to reduce execution errors can be performed with the use of one or more computing devices connected for data communication via wireless or wired communication, as shown in FIG. 1 and in accordance with the process 300 and 600 of FIGS. 3 and 7, respectively. FIG. 7 is a functional block diagram illustration of a computer hardware platform that can communicate with various networked components, such various software developers, API hosting server 110, specification database 112, various endpoints 120, etc., discussed in the context of FIG. 1. In particular, FIG. 7 illustrates an appropriately configured network or host computer platform 700, as may be used to implement a server, such as the matching server 116 of FIG. 1.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the API matching engine 740, in a manner described herein. The API matching engine 740 may have various modules configured to perform different functions. For example, there may be an interaction module 742 that is operative to receive API specifications 113 from an API specification database 112, applications 105 having API code usage from various developers 101(1) to 101(N), and other functions discussed herein. There may be an extraction module 744 operative to extract various features from the API code usage and/or API specifications 113 that are available to the API matching engine 103. There may be a process identification module 746 that is operative to parse various identifiers into sensible words.

The API matching engine 103 may include a text matching module 748, classification module 750, and/or clustering module 752 to automatically match probabilities between the API code usage and the API specification. The matching, classification and clustering modules can be performed concurrently, in series, or alternatively (if one approach does not provide a match that has a confidence level that is above a predetermined threshold).

In one embodiment, there is a report module 756 operative to provide a notification as to whether a match between an API code usage and an API specification could be performed and/or the confidence level in the probabilistic match. This notification can be send to one or more appropriate recipients, such as software developers of the subject program having the API code usage or a user of the same.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other appropriately configured programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a matching engine configured to perform acts comprising:
   receiving a program having an application program interface (API) code usage;
   extracting features from the API code usage;
   extracting features from meta data of a plurality of API specifications;
   for each API specification of the plurality of API specifications, determining a match probability with the API code usage;
   determining an API specification having a highest probability; and
   matching the API code usage with the API specification having the highest probability.

2. The computing device of claim 1, wherein the features of the API code usage comprise at least one of: a schema, an HTTP method, a host, one or more path segments, or one or more query parameters.

3. The computing device of claim 1, wherein extracting features from meta data of the plurality of API specifications comprises, for each API specification:
   determining a specification release date;
   determining a date that a code snippet related to the API specification was last modified;
   determining the API versioning requirements imposed by library dependencies, and
   determining a version of the API specification.

4. The computing device of claim 3, wherein the matching engine is further configured to perform acts comprising, upon determining that the specification release date is after a date of the API code usage, excluding the API specification from the matching.

5. The computing device of claim 1, wherein determining a match probability comprises using a text matching between the API specification and the API code usage.

6. The computing device of claim 1, wherein determining a match probability comprises using a classification heuristic via machine learning.

7. The computing device of claim 6, wherein a training data, for the creation of a model by the machine learning, is self-generated by randomly removing features from API code usage, each having a known corresponding API specification.

8. The computing device of claim 1, wherein determining a match probability comprises using a clustering heuristic.

9. The computing device of claim 1, wherein the matching engine is further configured to perform acts comprising, upon determining that the API specification having the highest probability is below a predetermine threshold, identifying the match as a failure and generating a notification indicating that a probabilistic match could not be performed.

10. The computing device of claim 1, wherein the matching engine is further configured to perform acts comprising, upon matching the API code usage with the API specification having the highest probability, allowing the program to communicate with a requested endpoint by way of the matched API specification.

11. A non-transitory computer readable storage medium tangibly embodying a computer readable program code having computer readable instructions that, when executed, causes a computer device to carry out a method of matching an application program interface (API) code usage with an API specification, the method comprising:
   receiving a program having an API code usage;
   extracting features from the API code usage;
   extracting features from meta data of a plurality of API specifications;
   for each API specification of the plurality of API specifications, determining a match probability with the API code usage;
   determining an API specification having a highest probability; and
   matching the API code usage with the API specification having the highest probability.

12. The non-transitory computer readable storage medium of claim 11, wherein the features of the API code usage comprise at least one of: a schema, an HTTP method, a host, one or more path segments, or one or more query parameters.

13. The non-transitory computer readable storage medium of claim 11, wherein extracting features from meta data of the plurality of API specifications comprises, for each API specification:
   determining a specification release date;
   determining a date that a code snippet related to the API specification was last modified;
   determining the API versioning requirements imposed by library dependencies, and
   determining a version of the API specification.

14. The non-transitory computer readable storage medium of claim 13, further comprising, upon determining that the specification release date is after a date of the API code usage, excluding the API specification from the matching.

15. The non-transitory computer readable storage medium of claim 11, wherein determining a match probability comprises at least one of:
   using a text matching between the API specification and the API code usage;
   using a classification heuristic via machine learning; or
   using a clustering heuristic.

16. The non-transitory computer readable storage medium of claim 15, wherein a training data, for the creation of a model by the machine learning, is self-generated by randomly removing features from API code usage, each having a known corresponding API specification.

17. The non-transitory computer readable storage medium of claim 11, further comprising, upon determining that the API specification having the highest probability is below a predetermine threshold, identifying the match as a failure and generating a notification indicating that a probabilistic match could not be performed.

18. The non-transitory computer readable storage medium of claim 11, further comprising, upon matching the API code usage with the API specification having the highest probability, allowing the program to communicate with a requested endpoint by way of the matched API specification.

19. A computer implemented method comprising:
   receiving a program having an API code usage;
   extracting features from the API code usage;
   extracting features from meta data of a plurality of API specifications;
   upon determining that an exact match between the API code usage and the plurality of API specifications cannot be performed:
      for each API specification of the plurality of API specifications, determining a match probability with the API code usage;

determining an API specification having a highest probability;

matching the API code usage with the API specification having the highest probability; and upon determining that the API specification having the highest probability is below a predetermine threshold, identifying the match as a failure and generating a notification indicating that a probabilistic match could not be performed.

20. The computer implemented method of claim 19, further comprising, upon matching the API code usage with the API specification having the highest probability, allowing the program to communicate with a requested endpoint by way of the matched API specification.

* * * * *